United States Patent [19]
Tseung et al.

[11] Patent Number: 5,470,673
[45] Date of Patent: Nov. 28, 1995

[54] ELECTROCHROMIC AND ELECTROCATALYTIC MATERIAL

[75] Inventors: Alfred C. C. Tseung; Pei K. Shen; Jade Syed-Bokhari, all of Essex, United Kingdom

[73] Assignee: University of Essex, Colchester, United Kingdom

[21] Appl. No.: 108,646

[22] PCT Filed: Feb. 28, 1992

[86] PCT No.: PCT/GB92/00364

§ 371 Date: Nov. 12, 1993

§ 102(e) Date: Nov. 12, 1993

[87] PCT Pub. No.: WO92/16027

PCT Pub. Date: Sep. 17, 1992

[30] Foreign Application Priority Data

Mar. 1, 1991 [GB] United Kingdom ............... 9104377

[51] Int. Cl.$^6$ ..................... H01M 8/00; B05D 1/18
[52] U.S. Cl. .................. 429/44; 205/241; 205/255; 427/437; 427/443.1
[58] Field of Search .............................. 205/241, 255; 427/437, 443.1; 429/40, 44, 13, 12

[56] References Cited

PUBLICATIONS

Journal of the Electrochemical Society, vol. 138, No. 9, Sep. 1991, P. K. Shen et al. "The Performance of Electrochemical Tungsten Trioxide Films Doped With Cobalt or Nickel", pp. 2778–2783.

Journal of Electrochemical Society pp. 874–875 Extended Abstracts (Aug. 1988).

Chemical Abstracts—The Performance of Electrochromic Tungsten Etc. (Aug. 1988).

Methanol Oxidation Characteristics of Rare Earth Tungsten etc. (Aug. 1988).

*Primary Examiner*—Anthony Skapars
*Attorney, Agent, or Firm*—Kane, Dalsimer, Sullivan, Kurucz, Levy, Eisele and Richard

[57] ABSTRACT

A process provides for an electrochemical deposition by forming a solution of ions of at least one metal (A) capable of forming a hydrogen bronze and ions of at least one metal (B) from Group VIII of the periodic table, and causing electrochemical deposition from the solution onto a cathodic substrate.

29 Claims, 15 Drawing Sheets

ELECTROCHROMIC AND ELECTROCATALYTIC MATERIAL

BACKGROUND OF THE INVENTION

1. Field of the Invention

This invention relates to a novel electrochromic and electrocatalytic material supported on a substrate, to a process for the preparation of the said material, to its use in electrochromic applications, and to its use as an electrocatalyst, more especially in alcohol fuel cells, in the electrochemical determination of alcohol contents and in the electrochemical oxidation of gaseous mixtures, more especially gaseous mixtures including carbon monoxide, for example, reformed gases containing hydrogen, carbon dioxide and carbon monoxide.

2. Brief Description of Related Art

Tungsten trioxide is an electrochromic material which colours by a reduction process. For applications to displays and windows, tungsten trioxide has been considered as a potential competitor to liquid crystals. However, there have been certain problems hindering its widespread acceptance, a crucial one being relatively slow response time arising from the fact that tungsten trioxide has relatively high resistivity and overpotential for hydrogen oxidation and evolution.

The reaction for the colouration of a tungsten trioxide film to hydrogen tungsten bronze in an acidic medium is as follows:

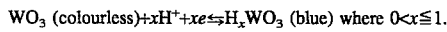

$WO_3$ (colourless)$+xH^{+}+xe \rightleftharpoons H_xWO_3$ (blue) where $0<x \leq 1$.

The forward reaction is the colouring process and the backward reaction is the bleaching process. The colouring rate is limited by the diffusion rate of the hydrogen into the $WO_3$ film to form the electronically conducting hydrogen tungsten bronze, as the initial reaction occurs at the interface of the conducting substrate and the film. If the highly resistive tungsten trioxide layer could be made more conductive, then this would have the effect of increasing the rate of colouration. One method of doing this is by the incorporation of catalysts into the film. It has previously been proposed to admix platinum black with tungsten trioxide powder, to bind the resulting mixture using a PTFE dispersion and to support the bonded mixture on a metallic screen. Use of such a Pt/$WO_3$ mechanical admixture results in very active hydrogen evolution since the hydrogen evolution and oxidation overpotential on platinum is very low and the hydrogen formed readily diffuses into the tungsten trioxide lattice. The resulting hydrogen tungsten bronze will also participate in the electrochemical reaction, the so-called spill-over effect. Pt/$WO_3$ mixtures, however, have the drawback that they rely on contacts between platinum particles and tungsten trioxide particles and not all of the platinum atoms can be utilised.

SUMMARY OF THE INVENTION

The present invention provides an electrochemical deposition process which comprises forming a solution of ions comprising at least one metal (A) capable of forming a hydrogen bronze and ions comprising at least one metal (B) from Group VIII of the periodic table, and causing electrochemical deposition from the said solution onto a cathodic substrate.

The electrodeposited material obtainable by the process of the invention has both electrochromic and electrocatalytic properties.

DETAILED DESCRIPTION OF THE INVENTION

Figure 1A:
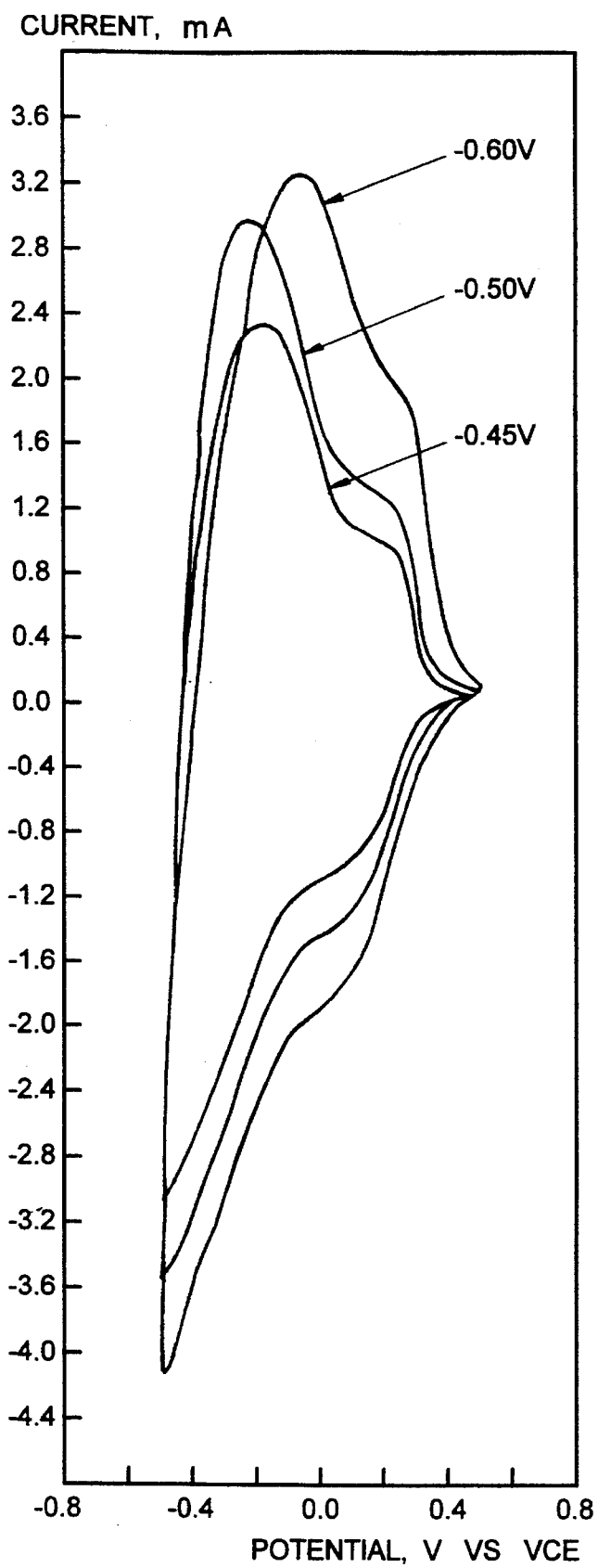
FIGS. 1a, 1b and 1c show the typical cyclic voltammetry curves (in 0.5 mol/l sulphuric acid, +0.5 V to −0.5 V vs Standard Calomel Electrode, scan rate 50 mV/s) of, respectively, tungsten trioxide films, tungsten trioxide films doped with cobalt and films doped with nickel, deposited (at the various cathodic potentials shown on the Figures) on indium-tin-oxide-coated glass.

Advantageously, the metal (A) capable of forming a hydrogen bronze is one or more of tungsten, molybdenum and vanadium, more especially tungsten. The metal (A) is preferably present in the ions in solution in its highest oxidation state (for example, tungsten is preferably in the +6 oxidation state) but there is preferably no excess oxidant (for example, hydrogen peroxide) present.

The Group VIII metal (B) is advantageously one or more of nickel, cobalt, palladium, platinum, iron and ruthenium.

The concentration of the Group VIII metal(s) (B), in moles of total metal, is advantageously from 0.01 to 1.0, preferably from 0.05 to 1.0, more especially from 0.2 to 0.6 times the concentration of the metal(s) (A), for example tungsten, in moles of total metal, and may be from 2 to 200, especially 5 to 50, more especially 10 to 50, millimolar/l. In the case where the Group VIII metal (B) is nickel, it has been found that the performance of the product material as an electrocatalyst, for instance in the electrochemical oxidation of methanol, increases with increasing nickel content in the deposition solution. As a general rule, it will be possible to use lower concentrations of platinum than, for example, cobalt or nickel in order to obtain similar effects.

Advantageously, the cathodic potential at the substrate in the electrodeposition process of the invention is in the range of from −0.2 V to −0.6 V vs. SCE (Saturated Calomel Electrode). More generally, it is preferable that the cathodic potential should be below the potential of the reversible hydrogen electrode, so that the deposited product will initially include the hydrogen bronze of the metal(s) (A). As will be appreciated, problems may be expected if the metal(s) (A) in the initially deposited layer were to be wholly or mainly in the form of highly resistive oxide(s). Although deposition can be carried out with the cathodic substrate at potentials below −0.6v vs. SCE, there is then an increasing risk that there will be excessive hydrogen evolution during the deposition process.

The electrochemical deposition solution in the process of the invention will normally be an aqueous solution and advantageously also comprises one or more solvent-miscible organic compounds, preferably one or more alcohols. An alcohol for use in the process may be saturated or unsaturated, aliphatic, cycloaliphatic, aromatic (including hetero-aromatic) or araliphatic. The alcohol may be mono-, di- or polyhydric.

The inclusion of a solvent-miscible organic compound such as, especially, an alcohol, in the deposition solution offers a number of advantages in practice. In particular, the stability of the solution may be significantly improved and the electrochromic activity of the product (as evidenced by the cathodic peak current in cyclic voltammetry studies), as well as its electrocatalytic activity, may be enhanced. The increased solution stability obtainable, for example, by the incorporation of an alcohol is of particular importance during manufacture in order to prolong the shelf life of the reactants and thereby minimise waste. By way of example, in the case of tungsten dissolved in aqueous hydrogen peroxide, the incorporation of an alcohol such as ethanol can increase the stability of the deposition solution (with respect to undesired precipitation of tungsten trioxide) from less than 24 hours to 10 days or more. The reasons for the various improved results obtainable by the incorporation of a solvent-miscible organic compound are not fully understood, and it is considered that those results are quite unexpected.

The concentration of the solvent-miscible organic compound in the deposition solution may be in the range of from 10 to 80% by volume, advantageously from 10 to 50%.

Preferred alcohols are aliphatic alcohols, which may be straight-chain, branched-chain or cyclic, saturated or unsaturated. Preferred aliphatic alcohols are those having up to and including 7 carbon atoms, for example, methanol, ethanol, propan-1-ol, propan-2-ol, butyl alcohols, and allyl alcohol.

The substrate in the electrochemical deposition process of the invention may be, for example, gold foil, Indium-doped Tin Oxide (ITO) on glass, or may be a carbon substrate, for example, carbon fibre paper or graphite. As a further possibility, the substrate may be a porous plastics material bearing a layer of, for example, nickel deposited by an electroless technique. Alternatively, the substrate in the electrodeposition process may, for example, be aluminium foil and, after deposition, the resulting electrocatalytic layer (with aluminium foil backing) may be hot pressed onto a porous plastics substrate, after which the original aluminium foil substrate is dissolved to leave the electrocatalytic material on a porous plastics backing.

It is believed that, in the electrodeposition process of the invention, the Group VIII metal (B) is co-deposited with an oxide of the or each metal (A) and becomes part of the lattice structure thereof. It is not at present fully understood whether the metal (B) is incorporated in the lattice structure in an interstitial or substitutional manner, but it is clear that the metal (B) is not merely in a microfine mechanical dispersion with the oxide(s). The presence of the Group VIII metal(s) (A) in the deposited material can be shown by electron probe microanalysis (EDAX). However, both scanning and transmission electron microscopy, by standard techniques, of $Pt/WO_3$, $Ni/WO_3$ and $Co/WO_3$ electrodeposited in accordance with the invention has failed to detect the presence of discrete metallic particles or crystallites. Also, in the case of co-deposited nickel and cobalt, it has been found that the activity of the electrodeposited material is maintained despite lengthy exposure to acid media, indicating that there has been substantially no leaching out of the Group VIII metal.

To provide further evidence indicating the structure of the co-deposited material, a performance comparison was made between material obtained in accordance with the invention and a material comprising a layer of cobalt deposited on top of a tungsten trioxide film (by sequential electrodeposition from appropriate solutions). Cyclic voltammograms of the products were recorded in sulphuric acid solutions under the same experimental conditions in each case. In the case of nickel or cobalt deposited onto tungsten trioxide, the first sweep in the cyclic voltammetry test gave high anodic and cathodic currents but the current reverted to that for a tungsten trioxide film in subsequent sweeps, indicating corrosion of the cobalt and nickel. By contrast, the co-deposited $Co/WO_3$ and $Ni/WO_3$ materials of the invention could undergo 1 h cyclic sweeps without changes in the current.

In general, after electrodeposition in accordance with the invention, the deposited material and substrate will be washed and dried before use in electrochromic or electrocatalytic applications. Also, it may be advantageous in terms of performance to subject the product to a heat treatment before use, for example to a temperature of at least 60° C. for a period of at least 10 minutes, for instance to 70° C. for 30 minutes.

The thickness of material deposited on the substrate by the process of the invention may be in the range of from 0.2 to 1.0 μm for electrochromic applications, and from 0.5 to 20 μm for electrocatalytic applications.

By way of example, electrodeposition of $Ni/WO_3$ and $Co/WO_3$ in accordance with the invention will now be described, together with tests performed to determine the nature and electrochromic performance characteristics of the product.

Electrodeposition solutions were prepared by first dissolving tungsten powder in aqueous 30% hydrogen peroxide solution (AnalaR BDH). The excess hydrogen peroxide was decomposed by dipping a platinum black foil into the solution. The solution was brought up to the desired volume with various compositions of alcohol and water so that the final solution stoichiometry was 50 m mol/l tungsten in 30% ethanol+70% water. For doping solutions, either 20 m mol/l $CoCl_2$ or $NiCl_2$ was added. The resulting electrolyte mixtures were very stable and no precipitation occurred even after several weeks of storage.

For deposition and electrochemical measurements, a three-electrode cell was used (electrolyte volume: 100 ml). The counter electrode was a platinum foil and a Saturated Calomel Electrode (SCE) was used as the reference electrode.

The depositions were performed at room temperature on 1 cm×3 cm Indium doped Tin Oxide (ITO) glass slides or 1 cm×1 cm gold foils by the potentiostatic and galvanostatic methods. Nitrogen was continuously bubbled throughout deposition, both to stir the solution and to remove any dissolved oxygen. Before deposition, the ITO glass was ultrasonically cleaned in both detergent and distilled water and the gold foil was cleaned in alkaline and acid solutions, followed by rinsing with distilled water.

Cyclic voltammetric and potential pulse experiments were carried out on an Oxford Instrument potentiostat/galvanostat in conjunction with a waveform generator. To investigate the characteristics of tungsten trioxide films, 0.5 mol/l $H_2SO_4$ aqueous solution and also propylene carbonate solution containing 1 mol/l $LiClO_4$ and 2% water were used as electrolytes. The morphology and qualitative composition of the tungsten trioxide film doped with cobalt or nickel was also studied by Scanning Electron Microscopy (SEM) and by electron probe microanalysis (EDAX).

In the accompanying drawings, results obtained from the invention are illustrated, with comparisons with non-inventive procedures where appropriate.

Figure 1B:
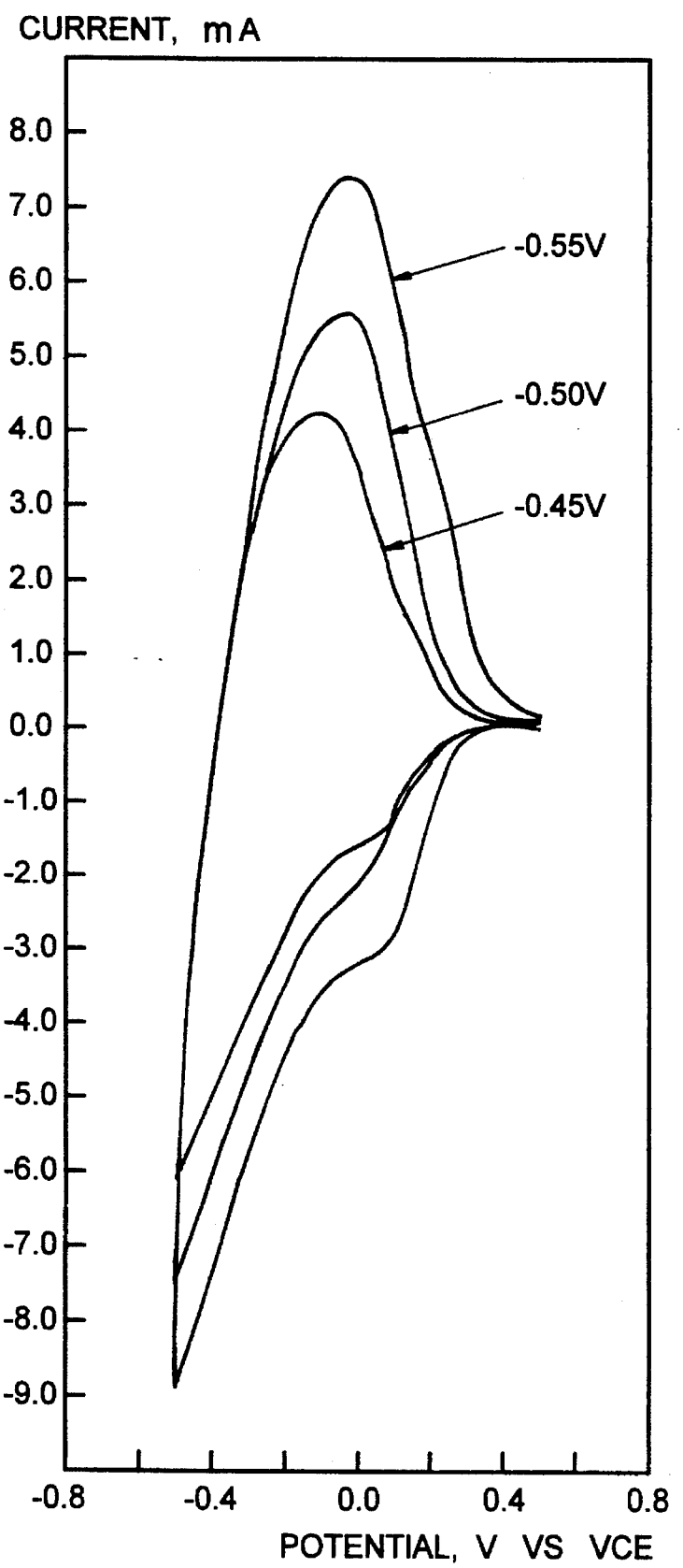
Figure 1C:
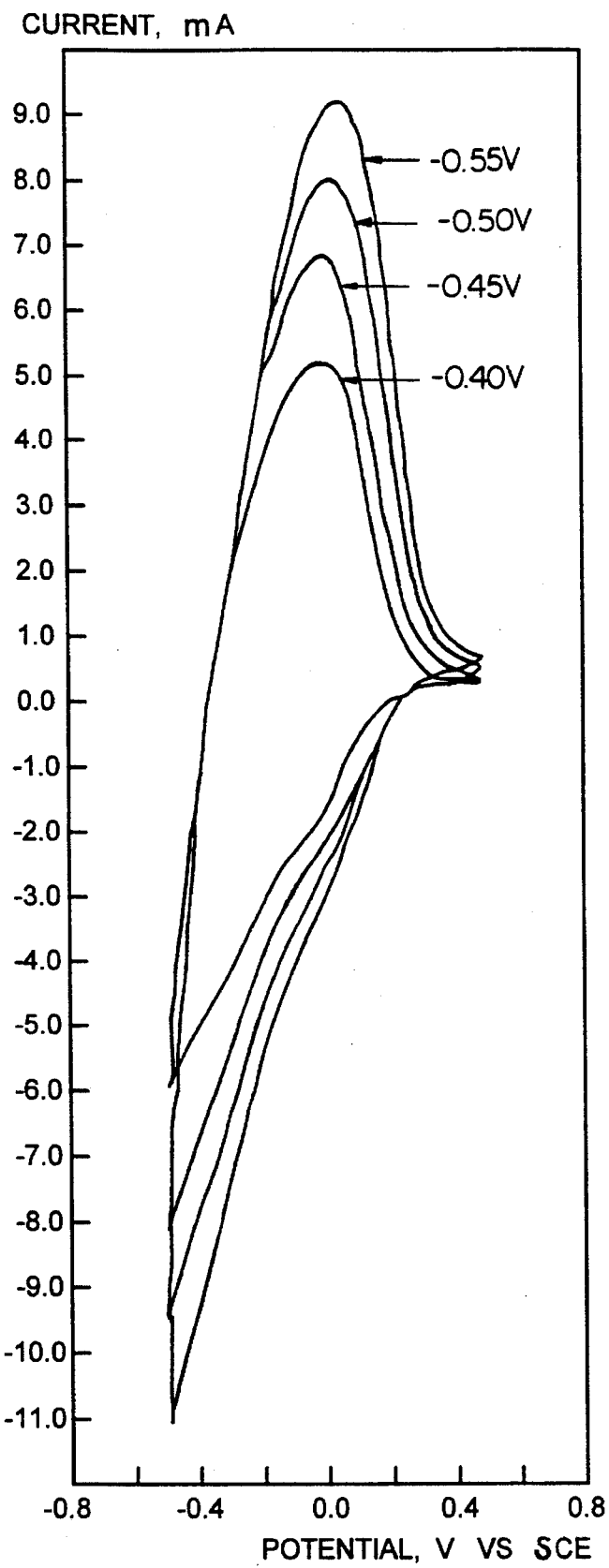
Figure 2:
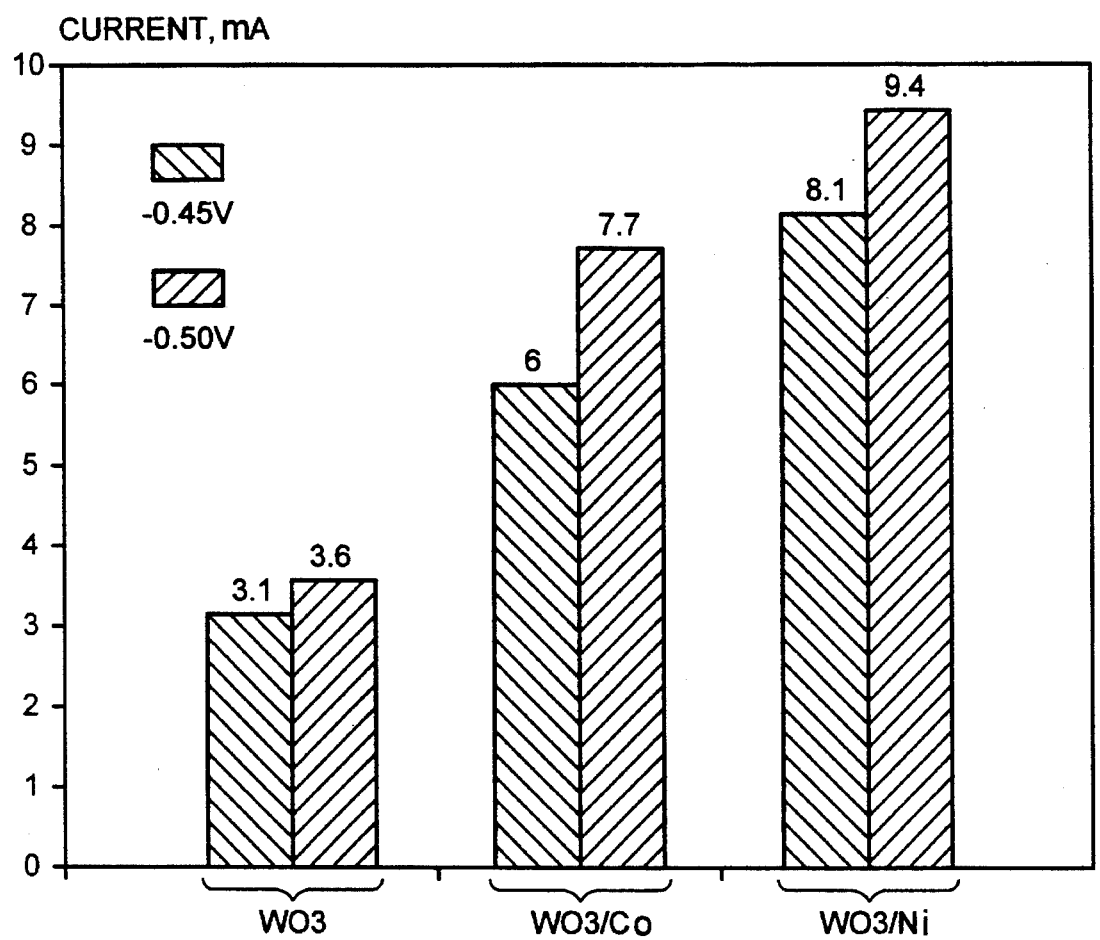
FIG. 2 shows a comparison to FIGS. 1a, 1b and 1c of their colouring currents at −0.45 and −0.5 V in 0.5 mol/l $H_2SO_4$ aqueous solution.

FIGS. 1a, 1b and 1c show the typical cyclic voltammetry curves (in 0.5 mol/l sulphuric acid, +0.5 V to −0.5 V vs Standard Calomel Electrode, scan rate 50 mV/s) of, respectively, tungsten trioxide films, tungsten trioxide films doped with cobalt and films doped with nickel, deposited (at the various cathodic potentials shown on the Figures) on indium-tin-oxide-coated glass. The comparison of their colouring currents at −0.45 and −0.5 V in 0.5 mol/l $H_2SO_4$ aqueous solution is shown in FIG. 2. The films were all deposited for 15 minutes from the above electrodeposition solutions (with and without doping). The cathodic current (colouring current) at a given potential provides an indication of the amount of hydrogen inserted into the tungsten trioxide lattice and hence the degree of colouration. The magnitude of the colouring current for the pure tungsten trioxide film is far less than for those doped with cobalt or nickel. For the doped films it can be seen that the nickel-doped film has a higher current than that of the cobalt-doped film. Thus, for the same colouring current, the doped films need a lower potential leading to decreased power consumption and increased operating lifetime, both of which are important in practical applications.

Electron probe microanalysis (EDAX) showed qualitatively the presence of cobalt or nickel, respectively, in the deposited material. Scanning electron microscopic (SEM) examination failed to detect discrete nickel or cobalt crystallites.

Traditional methods for incorporation of nickel, cobalt and iron into tungsten trioxide involve the use of solid state diffusion of the relevant components at elevated temperatures. Those methods will result in low surface area powder which cannot be made into films for electrochromic applications. In the electrochemical doping technique of the present invention, the distribution of nickel or cobalt in the tungsten trioxide films is uniform and such films are readily deposited as thin films on conducting substrates. In the conversion of tungsten trioxide to bronzes, the cobalt or nickel ions can transfer their valence electrons to the host oxide delocalized states.

For the solutions without cobalt or nickel, the deposited films were formed with cracks and were brown in colour. Activity was poor if the deposition current density was greater than 0.6 mA/cm². However, the doped films can be deposited at current density ranging from 0.3 to 1 mA/cm², and the films are active and crack free. It is important to control the deposition potential properly by potentiostatic control. If the deposition potential was made more negative than −0.45 V vs SCE, it was found that the films tended to be deposited with cracks because of the hydrogen evolution. Scanning electron micrographs of tungsten trioxide films doped with nickel show no evidence of a secondary phase and the grain size is less than 1 micron at −0.40 V.

Figure 3:
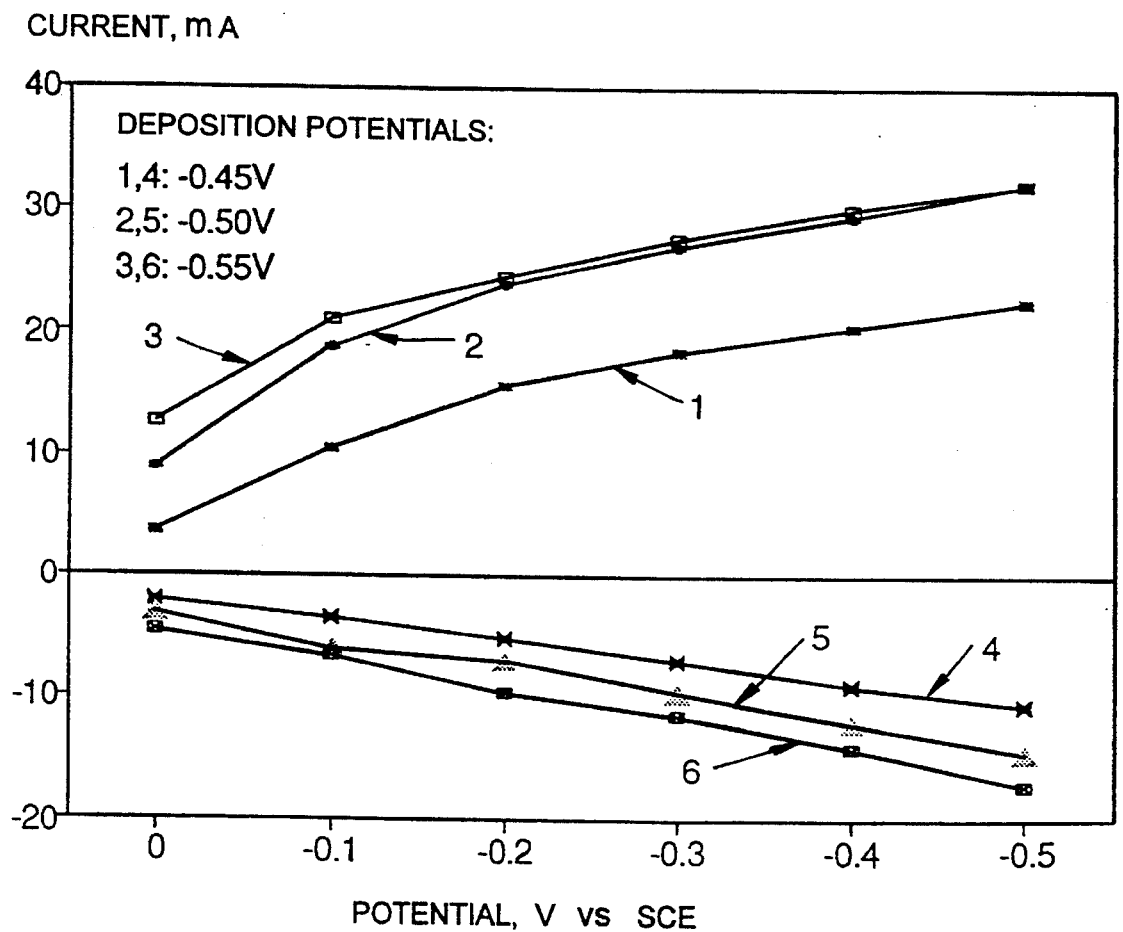
FIGS. 3 to 6 show plots of the transient peak current vs. pulse potential in potential pulse experiments on tungsten trioxide films doped with cobalt or nickel obtained by the process of the invention.
Figure 4:
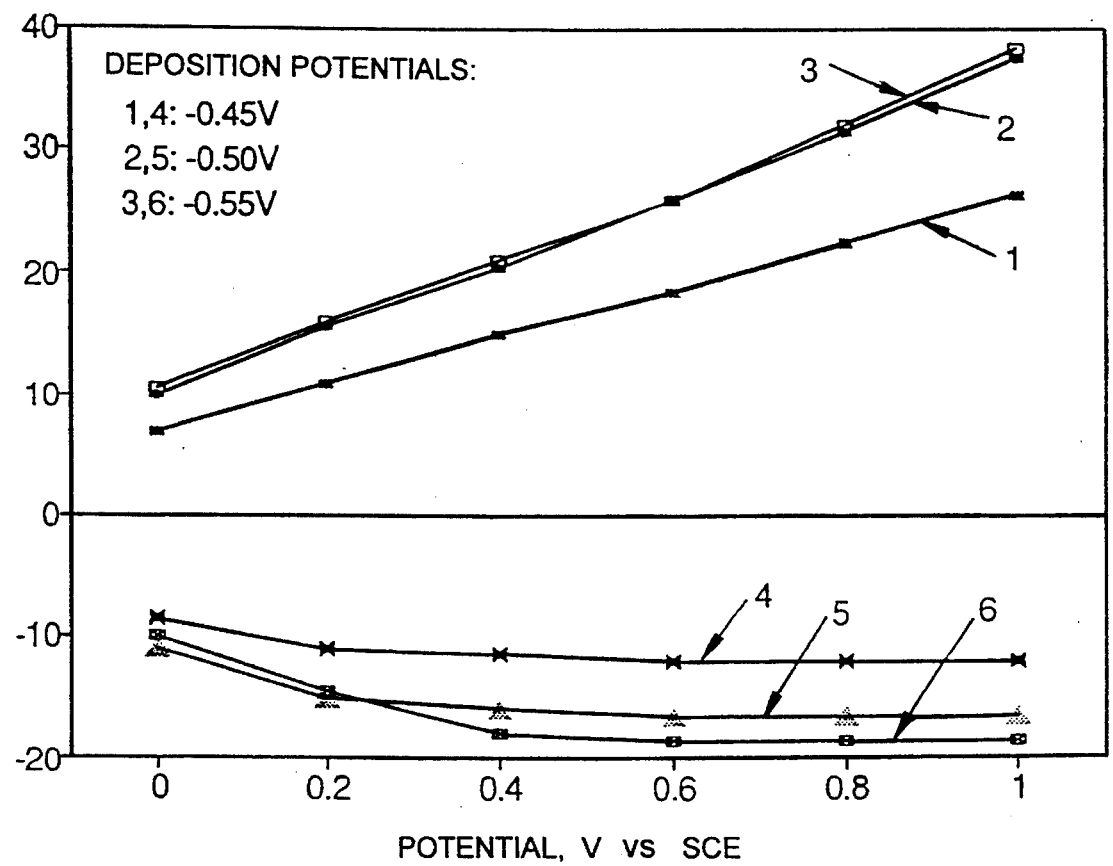
Figure 5:
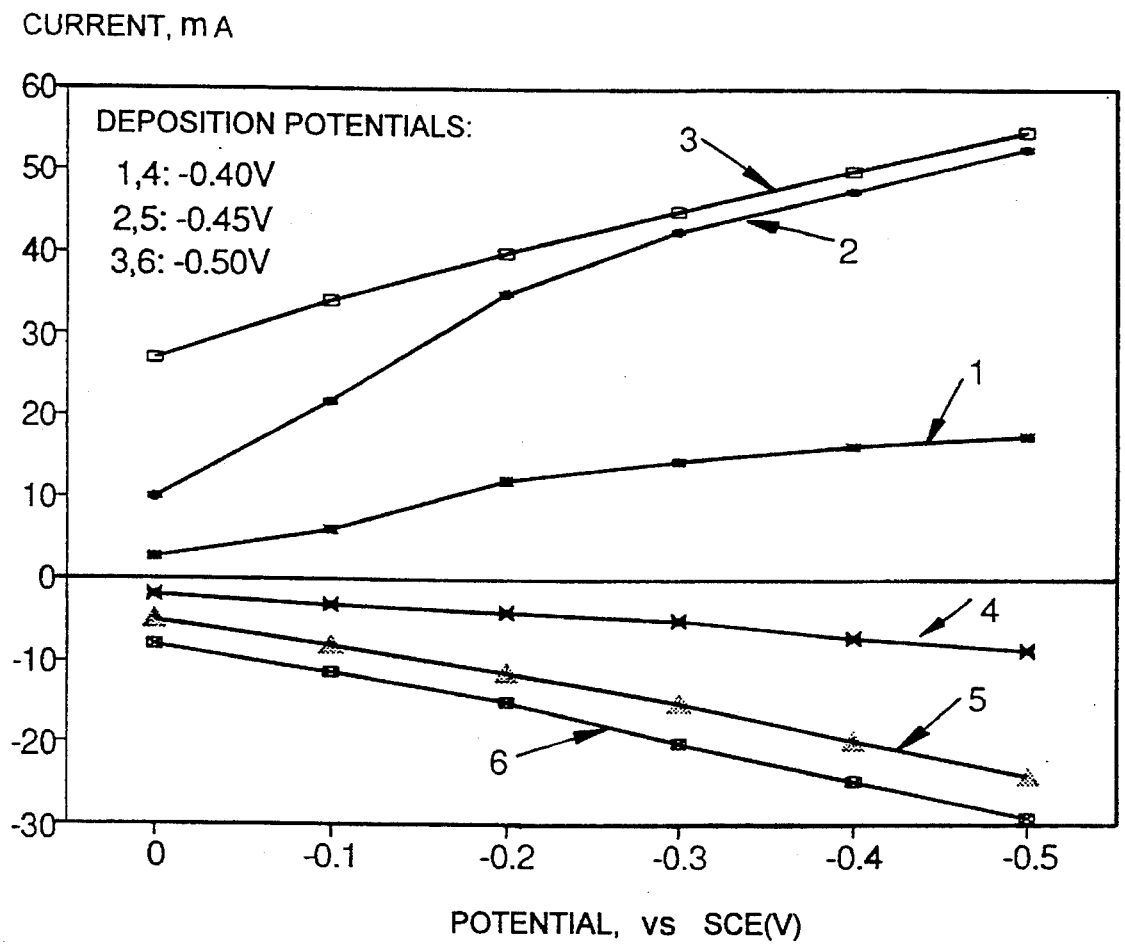
Figure 6:
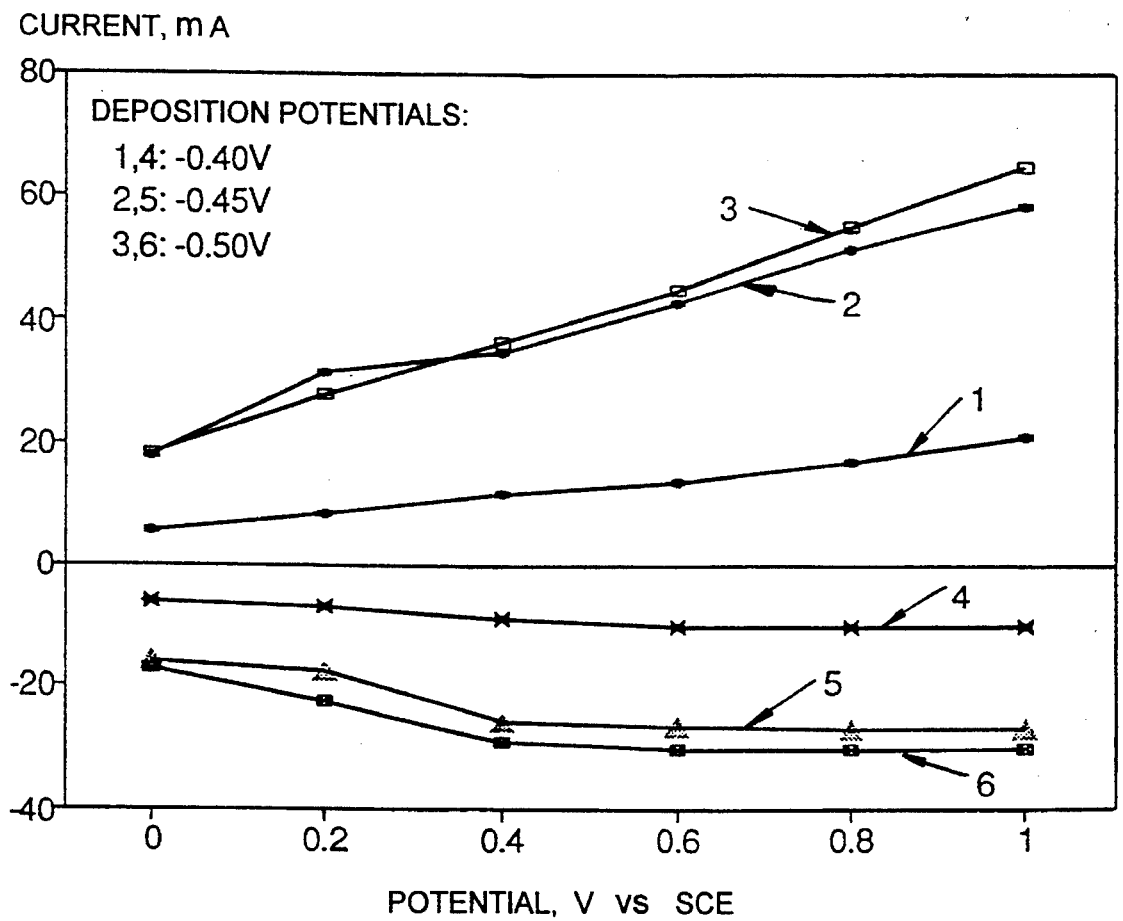
Figure 7:
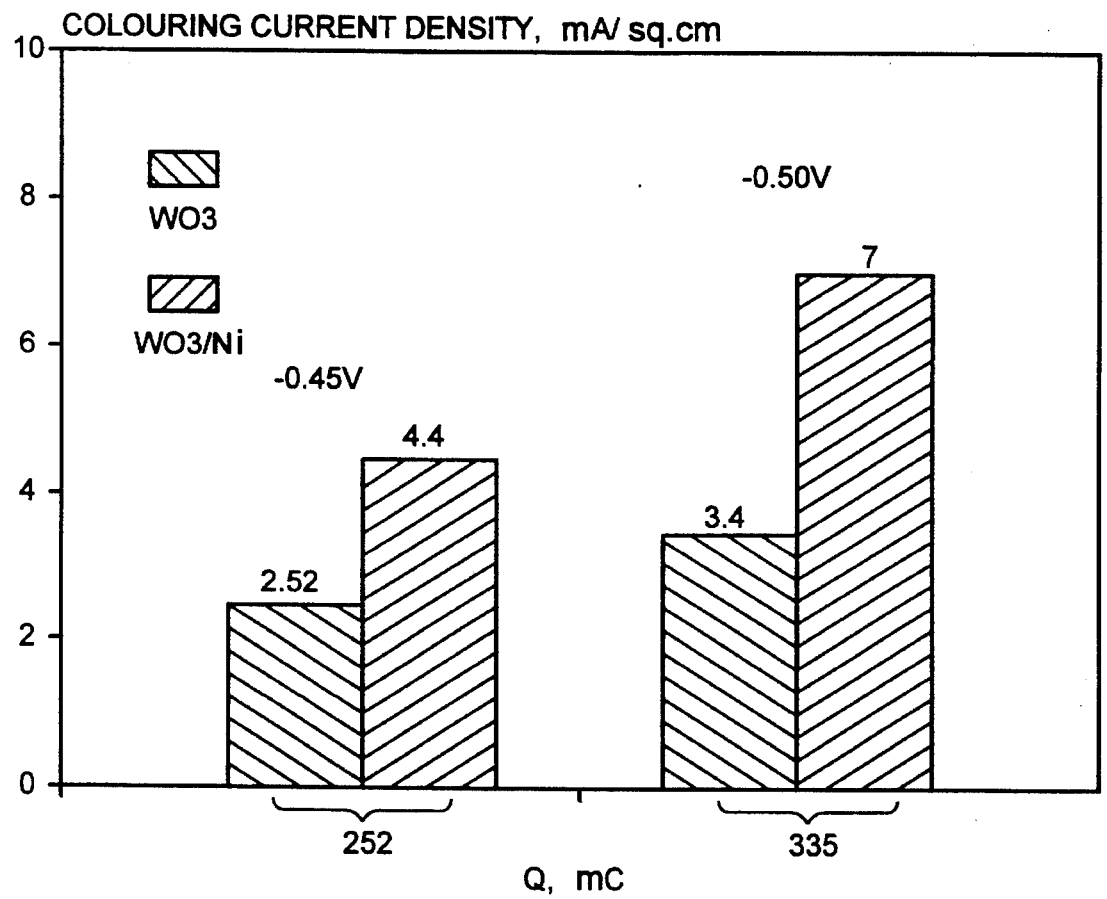
FIG. 7 is a comparison to FIGS. 3–6, to compare the current efficiency of deposition.

FIGS. 3 to 6 show plots of the transient peak current vs. pulse potential in potential pulse experiments on tungsten trioxide films doped with cobalt or nickel obtained by the process of the invention. In FIGS. 3 and 5 the initial potential of the samples was 0.8 V and these were pulsed to different colouring potentials, and then pulsed back to the initial potential. As negative bias increased, the coloured species also increased. This led to an increase in transient peak current. In FIGS. 4 and 6, the initial potentials of the samples were controlled at −0.5 V and then pulsed to different bleaching potentials, eventually pulsing back to the initial potential. It is worth noting that when the positive bias reaches 0.4 V, the transient peak colour current does not increase with further increase in positive bias. This is because the tungsten trioxide becomes insulating at potentials more positive than 0.4 V. Therefore, no further electrochemical reactions are possible. As it acts as a resistor, there will be no current contribution at the reverse. The above results indicated that the current from tungsten trioxide films doped with cobalt or nickel was much higher than undoped films. To compare the current efficiency of deposition, the charge quantity was controlled either by controlling deposition time according to the current-time curve during potentiostatic deposition or simply using galvanostatic deposition. The results were similar (FIG. 7).

The following experiments were carried out to illustrate the influence of certain variables on the performance of materials electrodeposited in accordance with the invention.

A tungsten solution (50 m mol/l in tungsten) was prepared by reacting tungsten powder (12μ, 99.9%, Aldrich Chemical Co.) in water and hydrogen peroxide (30% w/v, BDH). After the vigorous dissolution reaction was complete, a platinum black foil was dipped into the solution to decompose any excess hydrogen peroxide.

In one series of experiments, different deposition solutions were prepared from the tungsten solution prepared as above by adding various amounts of nickel chloride, and in another series of experiments different deposition solutions were prepared by incorporating various alcohols in addition to nickel chloride.

Films were deposited galvanostatically (1 mA, 3 minutes) onto gold substrates at room temperature from each of the deposition solutions so obtained. Nitrogen was bubbled through the solution at constant rate throughout each deposition process. After deposition, the film-coated gold electrodes were rinsed using distilled water.

The performance of the film-coated gold electrodes was tested by cyclic voltammetry (CV) at scan rates 75, 50, 25 mV/s, in the potential range +0.3 V to −0.3v vs. SCE, with 0.5 mol/l sulphuric acid as electrolyte and with prior nitrogen sparging to remove any adsorbed oxygen that might affect the CV traces.

Figure 8:
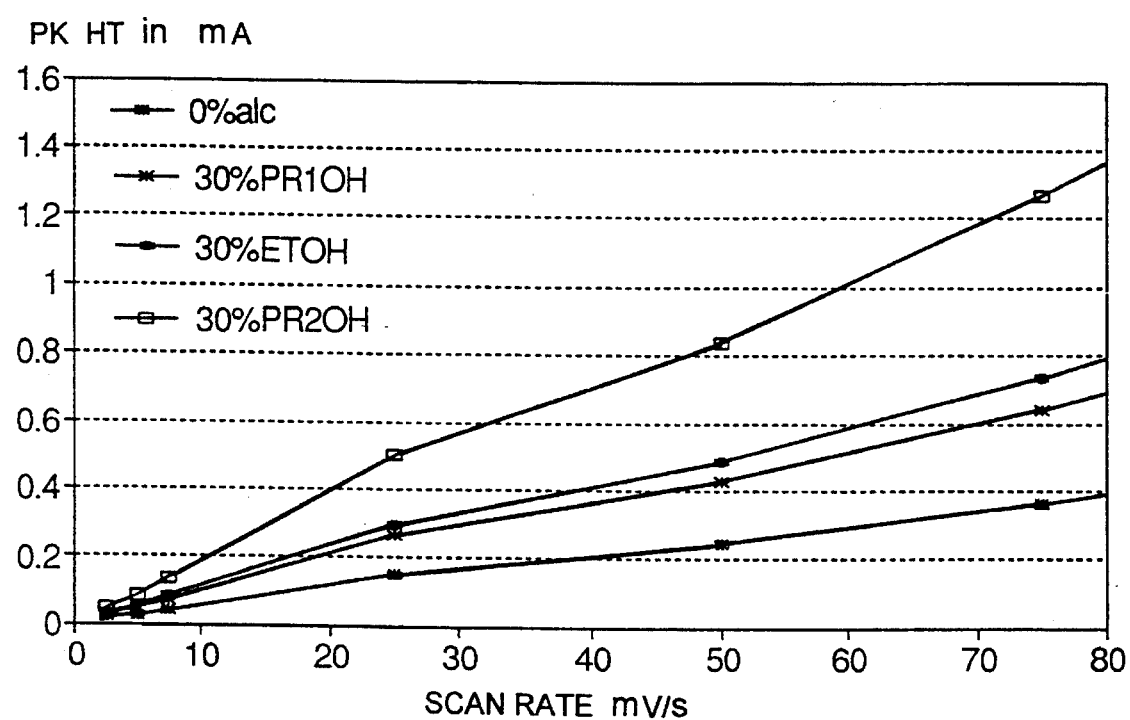
FIG. 8 shows the cathodic peak current in cyclovoltammetry as a function of scan rate for film-coated gold electrodes made from deposition solutions each 50 m mol/l in tungsten and 5 m mol/l in nickel and incorporating 30% v/v of one of a number of different alcohols, namely ethanol propan-1-ol and propan-2-ol.

FIG. 8 shows the cathodic peak current in cyclovoltammetry as a function of scan rate for film-coated gold electrodes made from deposition solutions each 50 m mol/l in tungsten and 5 m mol/l in nickel and incorporating 30% v/v of one of a number of different alcohols, namely ethanol propan-1-ol and propan-2-ol.

Figure 9:
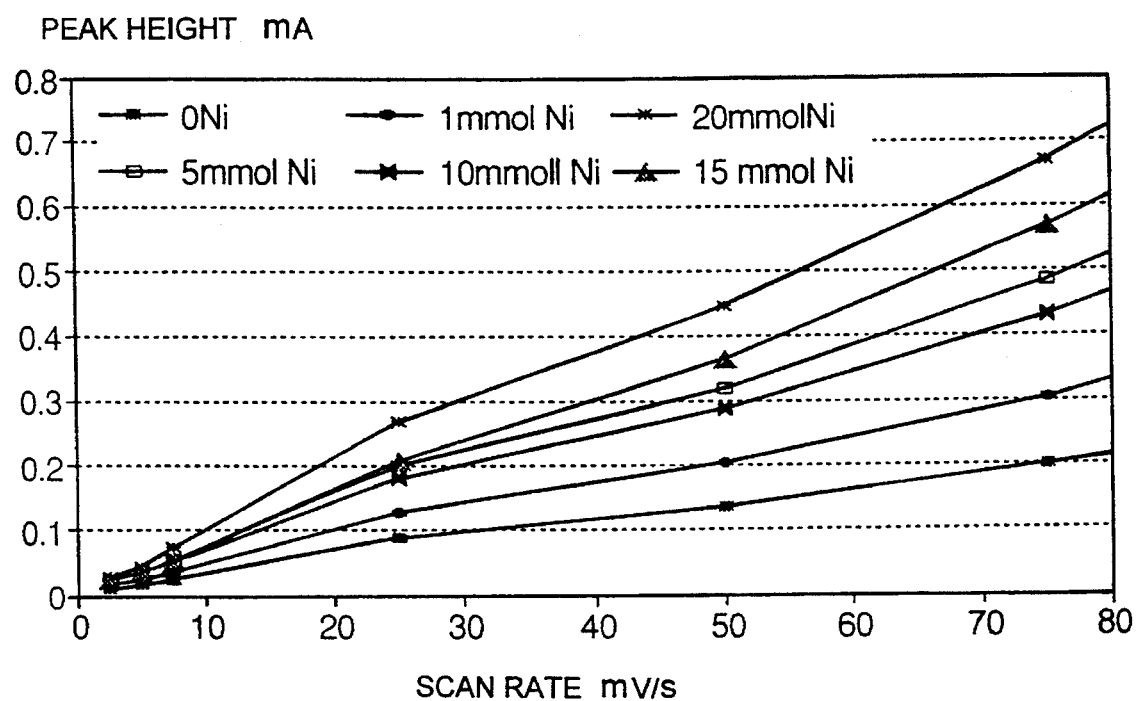
FIG. 9 shows the cathodic peak current in cyclovoltammetry as a function of scan rate for film-coated gold electrodes made from deposition solutions each 50 m mol/l in tungsten and incorporating different concentrations of nickel from 0 to 20 m mol/l.

FIG. 9 shows the cathodic peak current in cyclovoltammetry as a function of scan rate for film-coated gold electrodes made from deposition solutions each 50 m mol/l in tungsten and incorporating different concentrations of nickel from 0 to 20 m mol/l.

As already indicated, and in accordance with expectations, electrodeposited materials obtainable by the process of the invention possess electrocatalytic as well as electrochromic properties. An especially important use of such materials according to the invention is their use as electrocatalysts in the electrochemical oxidation of organic compounds, especially alcohols, preferably aliphatic alcohols containing up to 7 carbon atoms, more especially in fuel cells. Such a process will now be illustrated, by way of example, with reference to the electrochemical oxidation of methanol using, as catalyst, electrodeposited $Pt/WO_3$ obtainable by the process of the invention.

Anodic oxidation of methanol in acidic media is considered to involve a series of dehydrogenation steps, followed by oxidation of hydrogen and the dehydrogenated species. The overall reaction may be represented as follows:

$$CH_3OH + H_2O \rightarrow CO_2 + 6H^+ + 6e$$

In practice, using a $Pt/WO_3$ catalyst, it is considered that the following steps may be involved:

$$H_2O \longrightarrow OH_{ads} + H^+ + e \qquad (I)$$

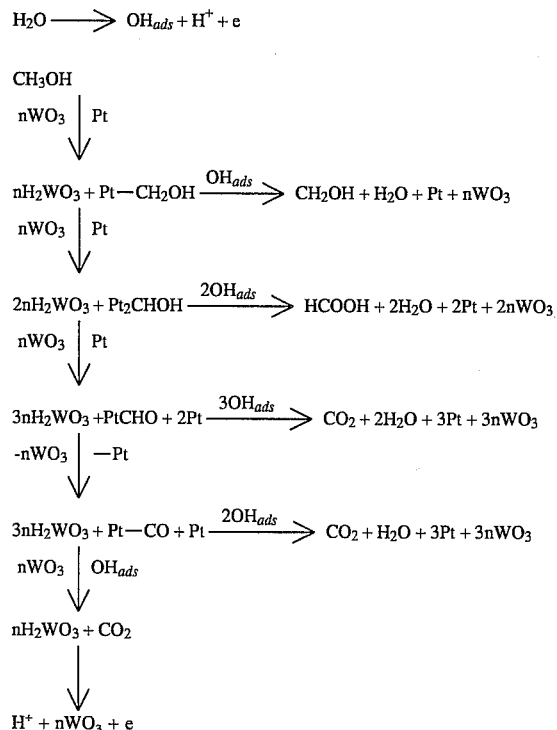

(II)

where n = 1/x

In accordance with this reaction mechanism, adsorbed methanol is dehydrogenated stepwise on the Pt surface, followed by further reaction of the dehydrogenated species with $OH_{ads}$ until the final products are $CO_2$ and water. In addition, the rate of hydrogen oxidation is speeded up by making use of the so-called "spill-over" effect involving the continuous formation and oxidation of hydrogen tungsten bronze, $H_xWO_3$.

It has been found in accordance with the invention, for example, that a $Pt/WO_3$ catalyst obtained by the electrodeposition process of the invention not only has increased catalytic activity as compared with conventional Pt/C catalysts, but is also less susceptible to poisoning by species such as CO, because $H_2O$ adsorbed on the $WO_3$ surface interacts with CO adsorbed on Pt. Cyclic voltammetric (CV) studies in acid media, for example, sulphuric acid solution, are used to provide an indicator of electrocatalytic activity: the higher the current density at a given potential in CV, the higher is considered to be the activity of the material under test.

The invention accordingly also provides the use of electrodeposited material obtainable by the process of the invention as a catalyst in the electrochemical oxidation of organic compounds, especially alcohols, more especially aliphatic alcohols containing up to 7 carbon atoms, for example up to 4 carbon atoms, preferably methanol or ethanol.

For transport applications, the direct methanol fuel cell has a number of advantages over other fuel cell systems, notably immediate starting-up from cold; a fuel which is inexpensive, readily available and easily stored; safety in use; and the possibility of a hybrid fuel cell/internal combustion engine using a common fuel. Despite their obvious advantages, however, there remain several unsolved problems, notably poisoning of the anode by intermediates produced in the methanol oxidation process, and the need to reduce both the loading of precious metal on the anode and the overpotential for methanol oxidation. Those problems can be considerably alleviated by the use of electrocatalytic electrodes made by the electrodeposition process of the invention.

Electrochemical oxidation of alcohols, especially in fuel cells, is normally carried out in acidic aqueous media, and the acid concentration in such media has hitherto typically been in the range of from 0.5 mol/l upwards, usually from 0.5–2 mol/l. In accordance with a preferred feature of the present invention, the acid concentration is below 0.5 mol/l, advantageously less than 0.4 mol/l, more especially less than 0.3 mol/l, and may be below 0.2 mol/l or below 0.1 mol/l, or even as low as 0.05 mol/l. The possibility of using lower acid concentrations than hitherto offers several advantages in that, in particular, it enables a wider range of materials to be used in cell construction and should lead to a prolongation of the useful life of the catalysts.

The acid is preferably a strong acid, and mention may be made of sulphuric acid, phosphoric acid and perchloric acid. The results obtained in hydrochloric acid solutions may be less good. Although the acidic medium may also comprise a supporting electrolyte, that is to say, a salt with or without a common anion with the acid (such as sodium sulphate in sulphuric acid), there is preferably no such supporting electrolyte. This is a surprising result, because it might have been expected that it would be necessary, consequential upon the use of a more dilute acid solution, to provide another source of anions to maintain the conductivity of the medium.

Hitherto, the alcohol concentration in fuel cells oeprating by electrochemical oxidation has typically been in the range of from 1 to 2 mol/l. As a result of the increased activity of catalysts in accordance with the prsent invention, it is possible to operate with a higher alcohol concentration, for example, from 3 to 5 mol/l alcohol or even more, which in turn offers the possibility of reducing the size of the electrolyte tank.

In the Example that follows, $Pt/WO_3$ electrodes on gold substrates were prepared by an electrodeposition process in accordance with the invention, and were then characterised and tested as electrocatalysts in the electrochemical oxidation of methanol.

In the Example, a $Pt/WO_3$ catalytic coating was co-deposited on gold substrates from a solution which was 0.1 mol/l in tungsten and 8 m mol/l chloroplatinic acid. In preparing the solutions, tungsten powder was dissolved in aqueous 30% hydrogen peroxide solution. The solutions were brought up to the, desired volume with distilled-deionised water after decomposing excess hydrogen peroxide by means of a platinum screen coated with platinum black. The required amount of chloroplatinic acid was then added.

The electrodeposition was carried out potentiostatically at −0.25 V (vs. SCE) for 30 minutes. Scanning electron micrographs of the deposited coatings showed no evidence of a secondary phase (i.e. no discrete clusters of Platinum black), and that observation was confirmed by transmission electron microscopy.

Figure 10:
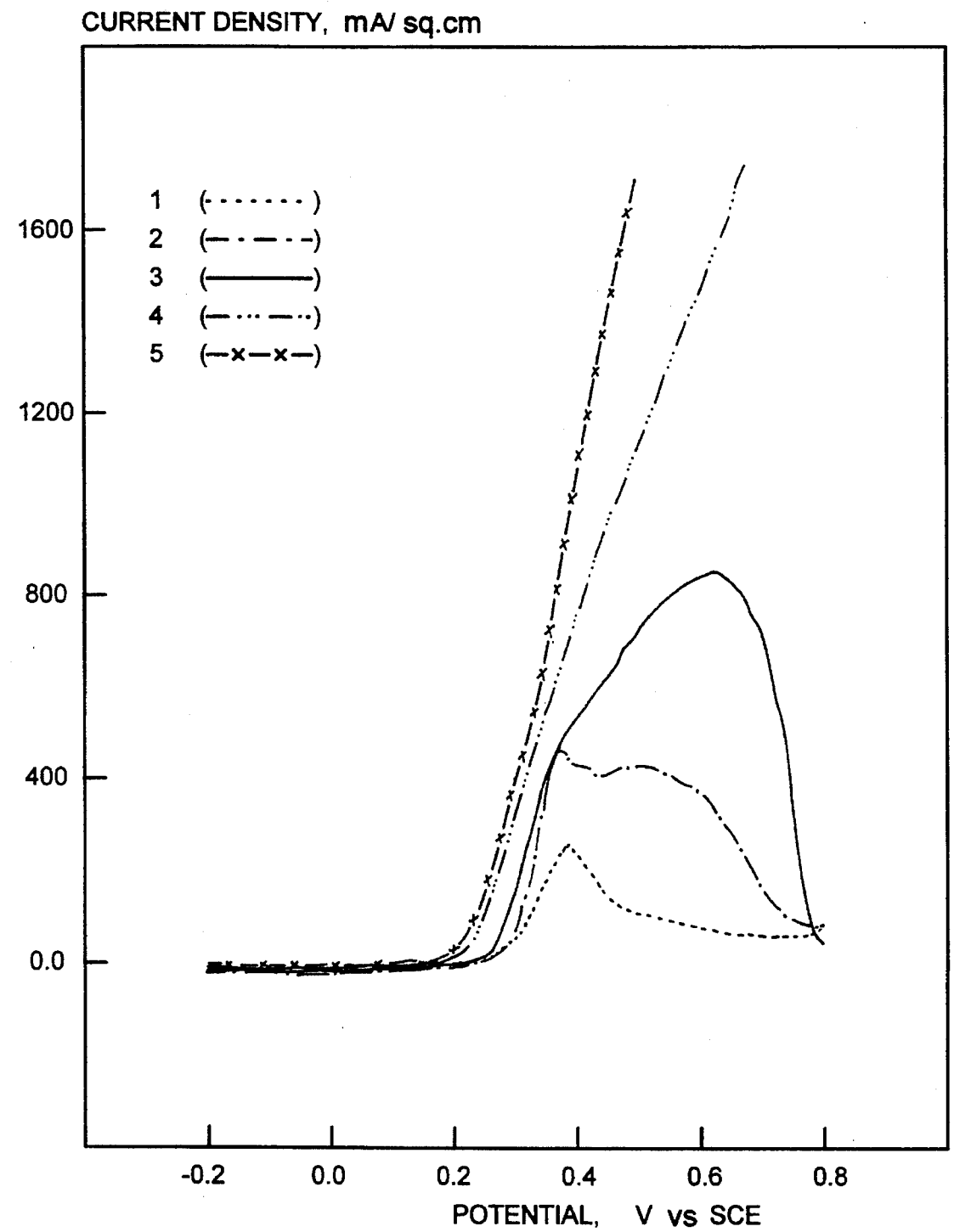
FIG. 10 shows the effect of varying the concentration of sulphuric acid in 1 mol/l (m) $CH_3OH$ at 30° C. The best results were obtained in 0.05 mol/l $H_2SO_4$.

The performance of the $Pt/WO_3$ electrodes was tested in various acidic methanol solutions:

FIG. 10 shows the effect of varying the concentration of sulphuric acid in 1 mol/l (M) $CH_3OH$ at 30° C. The best results were obtained in 0.05 mol/l $H_2SO_4$.

Figure 11:
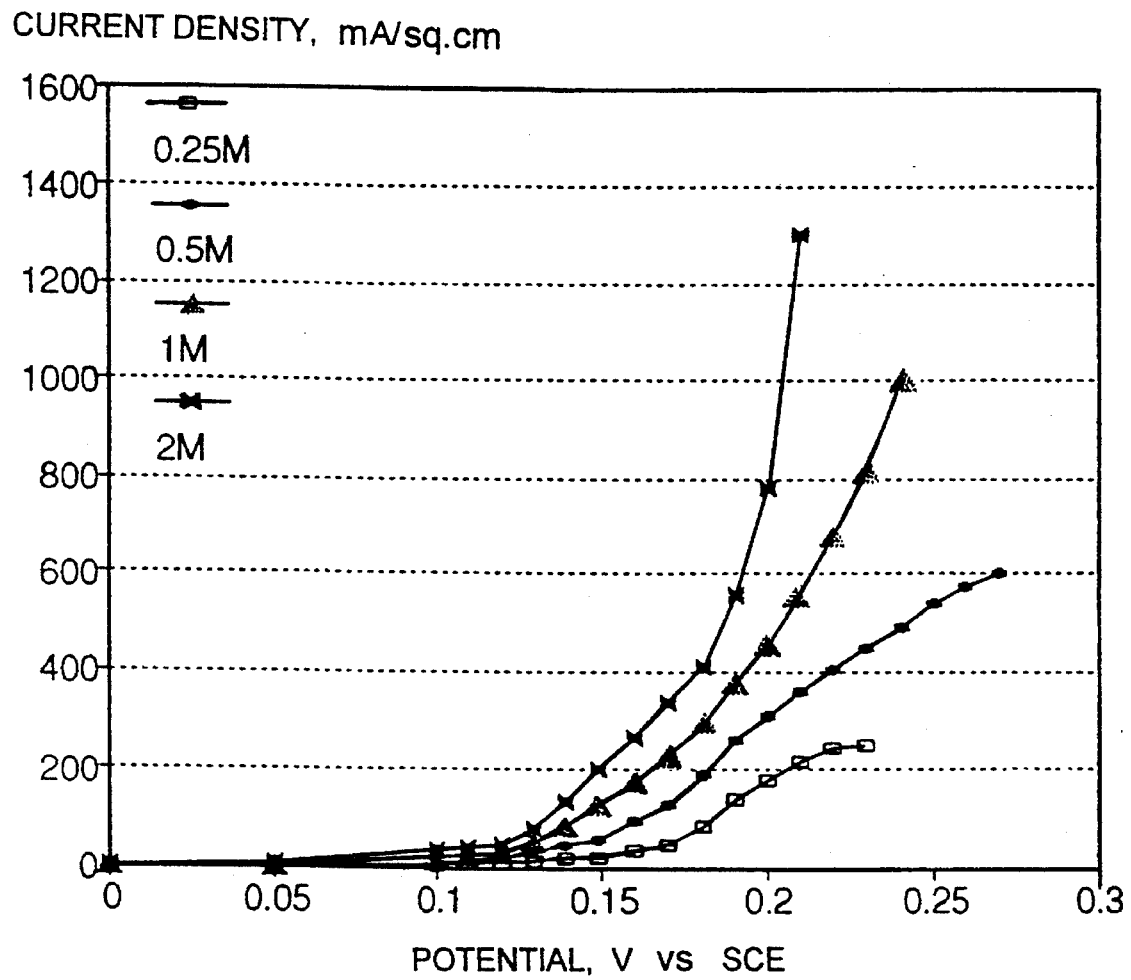
FIG. 11 shows the relationship between electrode activity and methanol concentration in 0.05 mol/l (M) $H_2SO_4$/0.2 mol/l (M) $Na_2SO_4$ solution at 60° C. (iR corrected). The performance improved progressively the higher the concentration of methanol.

FIG. 11 shows the relationship between electrode activity and methanol concentration in 0.05 mol/l (M) $H_2SO_4$/ 0.2 mol/l (M) $Na_2SO_4$ solution at 60° C. (iR corrected).

The performance improved progressively the higher the concentration of methanol.

Figure 12:
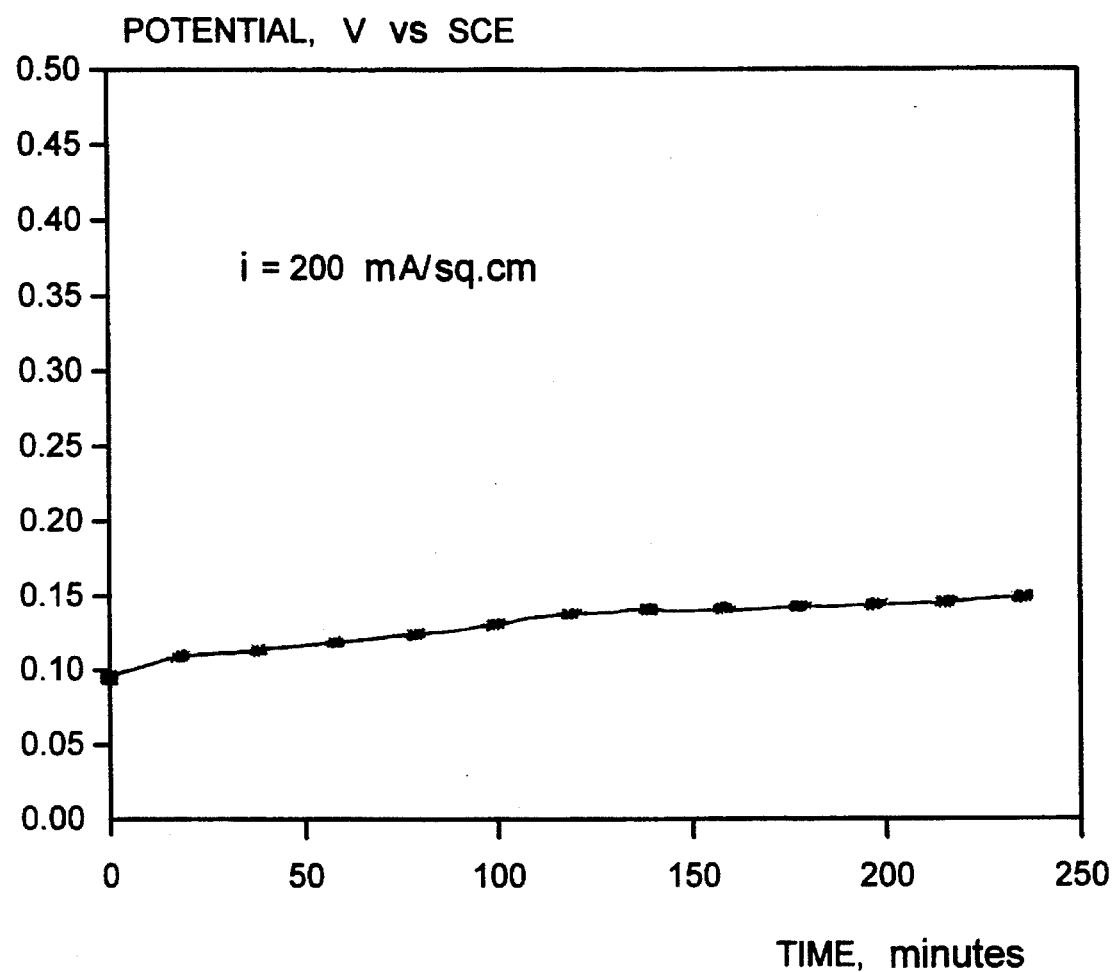
FIG. 12 shows the performance at 200 mA/cm², 60° C. over a test period of 240 minutes when the methanol concentration is increased to 5 mol/l. The steady state performance was excellent.

FIG. 12 shows the performance at 200 $mA/cm^2$, 60° C. over a test period of 240 minutes when the methanol concentration is increased to 5 mol/l. The steady state performance was excellent.

Figure 13:
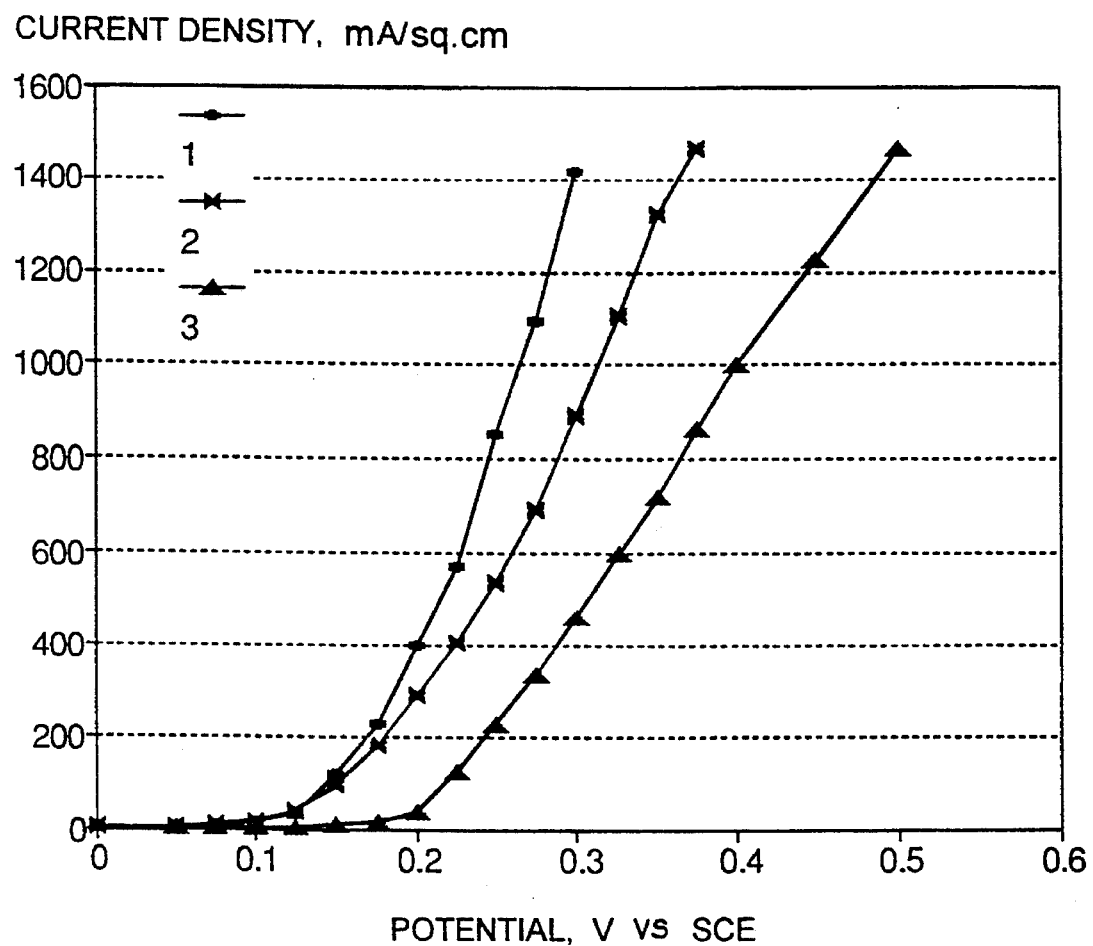
FIG. 13 shows the effect of using different acids in the methanol solution.

FIG. 13 shows the effect of using different acids in the methanol solution.

Electrodeposition of a $Pd/WO_3$ coating in accordance with the invention may be carried out, for example, from a solution which is 0.1 mol/l in tungsten and 8 m mol/l palladium chloride.

By way of example of the electrochemical determination of alcohol concentrations using electrocatalytic electrodes prepared by electrodeposition in accordance with the invention, the first step is to prepare a calibration curve of the anodic current at an anodic oxidation potential, controlled by a potentiostat, of 0.5 V vs. SCE at 20° C. for standard aqueous solutions of various concentrations of absolute ethanol. The anode comprises gold foil bearing an electrocatalytic material deposited in accordance with the invention. The catalyst loading was ~2 $mg/cm^2$. The counter electrode was platinum foil and the electrolyte was 1 mol/l $HClO_4$.

The alcohol content of test solutions was determined in each case by measuring the current output obtained using the test solution under the same conditions as in the calibration experiments and determining, from the calibration curve, the alcohol content corresponding to the measured current output.

Instead of causing co-deposition onto a substrate by an electrochemical method as described hereinbefore, co-precipitation in accordance with the invention may be effected by incorporating a chemical reducing agent into the solution of ions comprising at least one metal (A) capable of forming a hydrogen bronze and ions comprising at least one metal (B) from Group VIII of the periodic table. The resulting co-precipitated material may then be recovered in powder form, bonded for electrocatalytic use by means of a thermoplastic particulate polymeric binder such as, for example, polytetrafluoroethylene, and the bonded material may then be applied, with suitable heat treatment, to a conducting substrate to form an electrode. The formation of electrodes by binding of electrocatalytic material in powder form, and applying the bonded material to a conducting substrate, is a technique which is in itself known.

The reducing agent must be capable of causing the required simultaneous co-reduction and co-precipitation and may comprise, for example, sodium or potassium borohydride, hydrazine or formaldehyde. Other suitable reducing agents will be apparent to those skilled in the art.

By way of example of a co-reduction and co-precipitation process in accordance with the invention, a sodium borohydride reducing agent may be added to a solution comprising chloroplatinic acid and tungsten dissolved in hydrogen peroxide. The resulting simultaneous reduction will result in co-precipitation of platinum and hydrogen tungsten bronze. The co-precipitated material may be recovered from the solution in powder form and may be fabricated into an electrode as described above.

In similar manner, a co-precipitated electrocatalytic and electrochromic material may be obtained from a solution comprising nickel chloride or cobalt chloride with tungsten dissolved in hydrogen peroxide.

An advantage of the reductive co-deposition process of the invention is that electrodes bearing the electrocatalytic co-deposited material may be made with a higher loading of the material, because the process is not subject to any problems of hydrogen evolution such as may occur at high deposition thicknesses in the electrodeposition process.

We claim:

1. An electrochemical or reductive co-deposition process, which comprises; forming a solution of ions comprising at least one metal (a) of a hydrogen bronze and ions comprising at least one metal (b) from Group VIII of the periodic table, and causing electrochemical deposition from the solution onto a cathodic substrate, or causing co-precipitation by incorporating a chemical reducing agent into the solution.

2. A process as claimed in claim 1, wherein the metal (A) is one or more of tungsten, molybdenum and vanadium.

3. A process as claimed in claim 1 or claim 2, wherein the metal (a) is present in the ions in the deposition solution in its highest oxidation state.

4. A process as claimed in claim 1, wherein there is no excess oxidant present in the deposition solution.

5. A process as claimed in claim 1, wherein the Group VIII metal (B) is one or more of nickel, cobalt, palladium and platinum.

6. A process as claimed in claim 1, wherein the total concentration of the Group VIII metal(s) in the deposition solution is in the range of from 2 to 200 millimolar/l, especially from 10 to 50 millimolar/l.

7. A process as claimed in claim 1, wherein the concentration of the Group VIII metal(s) (B), in moles of total metal, is from 0.01 to 1.0 times the concentration of the metal(s) (A).

8. A process as claimed in claim 1, wherein the deposition potential at the cathodic substrate is in the range of from −0.2 V to −0.6 V vs. SCE.

9. A process as claimed in claim 1, wherein the deposition solution comprises one or more alcohols.

10. A process as claimed in claim 1, wherein the deposition solution comprises one or more straight-chain, branched-chain, cyclic, saturated or unsaturated aliphatic alcohols.

11. A process as claimed in claim 9, wherein the total alcohol concentration in the deposition solution is in the range of from 10 to 80% by volume.

12. A process as claimed in claim 1, wherein the substrate is gold foil, Indium-doped Tin Oxide (ITO) on glass, or carbon.

13. A process as claimed in claim 1, wherein the thickness of the material electrodeposited on the substrate is in the range of from 0.2 to 1.0 μm (for electrochromic applications) or in the range of from 0.5 to 20 μm (for electrocatalytic applications).

14. A process as claimed in claim 1, wherein after being washed and dried the deposited material and substrate is heat treated to a temperature of at least 60° C. for at least 10 minutes.

15. An alcohol oxidation fuel cell which incorporates an electrocatalytic electrode which comprises a substrate bearing a co-deposited material obtained by a process according to claim 1.

16. A co-deposited material obtained by a process according to claim 1.

17. A process for the oxidation of an organic compound, which comprises;

electrochemically oxidizing an organic compound in the presence of a catalytic proportion of an electrocatalyst which comprises the electrochemical or reductive co-deposit from a solution of ions comprising at least one metal (a) of a hydrogen bronze and ions comprising at least one metal (b) from group VIII of the Periodic Table.

18. The process of claim 17 wherein the organic compound is an alcohol.

19. The process of claim 18 wherein the alcohol is an aliphatic alcohol.

20. The process of claim 19 wherein the alcohol has from 1 to 7 carbon atoms.

21. The process of claim 17 wherein oxidizing is carried out in an acidic aqueous medium.

22. The process of claim 21 wherein the medium has an acid concentration below 0.5 mol/l.

23. The process of claim 22 wherein the acid concentration is in the range of from 0.05 to 0.4 mol/l.

24. The process of claim 22 wherein the acid is a strong acid.

25. The process of claim 22 wherein the medium is free of supporting electrolyte.

26. The process of claim 17 wherein the oxidizing is one one or more alcohols with a concentration in the range of from 1 to 5 mol/l.

27. The process of claim 26 wherein the oxidizing produces an output current which is then used as a measure of the alcohol content in a solution under test.

28. The process of claim 17 wherein the organic compound is in a gaseous mixture.

29. The process of claim 28 wherein the gaseous mixture comprises carbon monoxide.

* * * * *